DISCRETE ELEMENT MAGNETIC RECORDING

Filed Jan. 19, 1955 2 Sheets-Sheet 1

INVENTOR.
TUNG CHANG CHEN

BY Ralph K. Tomelf [signature]

AGENT

Jan. 24, 1961 TUNG CHANG CHEN 2,969,527

DISCRETE ELEMENT MAGNETIC RECORDING

Filed Jan. 19, 1955 2 Sheets-Sheet 2

*INVENTOR.*
TUNG CHANG CHEN

*BY* Ralph K. Bonell

AGENT 2,969,527
Patented Jan. 24, 1961

2,969,527

DISCRETE ELEMENT MAGNETIC RECORDING

Tung Chang Chen, Havertown, Pa., assignor to Burroughs Corporation, Detroit, Mich., a corporation of Michigan Filed Jan. 19, 1955, Ser. No. 482,854

3 Claims. (Cl. 340—174.1)

This application refers to magnetic means for the storage of digital information and it relates more particularly to an improved storage medium for use in computing apparatus which comprises a surface layer of discrete magnetic elements on a rotatable support rather than a continuous magnetic layer as found in prior art devices, and to methods of storing and reading information which employ a medium of this type.

In computers and like apparatus, one method of storing digital information has been to record the information as a pattern of magnetized and unmagnetized areas of a continuous thin layer of magnetic material formed on the surface of, or supported by, a rotatable drum or disc. Stationary magnetic heads in close proximity to the storage layer perform the operations of reading and writing and according to their respective positions trace and operate along individual circular data tracks as the supporting member rotates. Along these tracks magnetized and unmagnetized areas of the same material alternate, the pattern of magnetized spots and the character of their magnetization being determined by the type of recording adopted.

An observed disadvantage of such arrangements has been that, owing to the continuous magnetic nature of the storage layer, the boundaries between magnetized and unmagnetiized areas tend to become poorly defined. This results, when reading the stored information, in the generation of output signals which are correspondingly poorly defined and which have lowered peak values and a lowered signal-to-noise ratio.

According to the principles of the present invention, instead of being present as a continuous layer, the magnetic material is confined to discrete, definitely bounded, areas isolated one from another by non-magnetic material or by material having greatly different magnetic properties. This is accomplished by forming the magnetic material into a plurality of thin elongated laminae or members of sheet form mounted in spaced relation on the surface of the support so that in each data track along which a recording or reading head operates there is a repeated alternation, not of magnetized and unmagnetized areas of the same material, but of discrete areas of magnetic and non-magnetic material, each magnetic area forming a cell adapted to store a "bit" of information. By this arrangement magnetized areas of a track do not under any conditions tend to merge with unmagnetized areas, but have sharp and definitely assigned boundaries.

The type of pattern in which the laminae are arranged and the dimensions and spacing of the laminae depend on the type of support, on the number of information tracks to be provided and on other factors. To particularize, if the support is a circular disc mounted for rotation about its axis and bearing the magnetic storage material on a plane surface thereof, the pattern of this material, within the scope of the invention, may take the form of an assembly of radial "spokes" whose number, and the number of concentric data tracks of which they are adapted to form a part, is in accordance with the required storage capacity of the apparatus. Various methods of forming a spoked pattern of laminae on the surface of a disc or a corresponding pattern on the surface of a drum may be employed, such as plating, printing and etching.

The above described sectionalization of the storage medium has a number of advantages besides those more immediately apparent. For example, with the same maximum degree of magnetization of the medium, it results in higher peak electrical output signals than are attained in continuous layer recording since the voltage developed in a reading head is proportional to the time derivative or time rate of change of the magnetic flux linking the winding thereof and the sharp boundaries of the magnetized elements in the presently disclosed arrangements produce a more sudden change of flux than do the relatively poorly defined boundaries of a magnetized spot in a continuous magnetic sheet.

It appears also that a more favorable magnetic field configuration can be produced at a reading head by the isolated magnetized elements of the present invention than is possible where such elements are immediately surrounded by magnetic material, due in part to the elimination of interfering fields resulting from partial magnetization of this boundary material.

From an operational viewpoint there is an advantage in having a clearly defined interval between the occurrence of the trailing edge of one output wave and the leading edge of the next wave in the reading operation since this interval becomes available for switching and other operations without interference from noise due to boundary magnetization.

The physical tolerances of certain of the components of the disclosed arrangements can be greater than those of corresponding components used in continuous layer recording, thus promoting economy in their manufacture. For example, it is not necessary to have a critical design of writing head in order to attain satisfactory definition of the areas magnetized thereby since the boundaries of these areas are not controlled by the design of the head.

Other advantages of the disclosed arrangements have to do with the possibility of using types of recording that are not always feasible where a continuous storage medium is employed because of the possibility of operational errors should an area to which a zero level of magnetization is assigned become partially magnetized. This is exemplified by the type of recording in which, along a data track, the magnetization must return to a definite zero value after each area of signal magnetization. The advantage of having non-magnetic material where zero magnetization is necessary for signal definition will be apparent.

An additional feature of sectionalized magnetic material as a storage medium is that the magnetizable areas of an information track thus constituted can be so formed that a boundary or boundaries thereof transverse to the direction of displacement may be used for reference purposes in defining the phase of rotation of the rotatable support or, from another viewpoint, for precisely locating the instantaneous position of a magnetized data area relative to a magnetic head or other stationary member. Thus, the sharply peaked impulses generated in a reading head by the passage thereby of such a boundary may be used to time the recording and reading of information by a head or heads operating along the same or other tracks and may serve the further purpose of gating or otherwise controlling the occurrence or utilization of data signals in other parts of a computer. No such inherently well defined positional indications can be derived from data track signals where a continuous recording medium is employed and therefore such indications have, in the past, been provided for by supplying an additional track on which timing or reference signals are recorded, this track not being useful for information storage and occupying space which could otherwise be used for storage.

Another feature of the invention closely related to the inherent phase or positional determination provided by the boundaries of the presently disclosed sectionalized magnetic data areas which is of advantage where there is no signal erasure apart from the recording process, is the ability to rewrite digital information in precisely located positions on the disc or drum; more particularly, to so register new information with respect to old information that the latter may be completely erased thereby in the rewriting process without there being a tendency toward the accumulation of vestigal magnetization at the boundaries of a signal area. This eliminates a previously observed source of noise and of unfavorable wave forms.

The use of alternate magnetic and non-magnetic areas in a digital data track has a further advantage in that it tends to reduce one limitation on the speed at which the operations of reading and writing can be carried out, this limitation being the time constant $$\frac{L}{R}$$

of the winding circuits of the inductive reading and writing heads. In continuous coating recording the high reluctance air gap in the magnetic circuit of the usual type of head is at all times magnetically shunted by this low reluctance coating. Thus, the joint reluctance of gap and magnetic coating being low, the inductance of the head remains constantly at a maximum value with the result that signal currents therein rise and decay at relatively slow rates. By periodically interrupting the magnetic coating, and thereby removing this shunt magnetic path, after one storage area of a track has passed a head and before a new area has arrived thereat in the rotation of the recording medium as provided for by the arrangements of the present invention, the inductance of the head is permitted to drop to a value below its maximum with a resulting periodic decrease in the effective time constant of its winding circuit which permits somewhat shorter rise and decay intervals for the signal currents.

As a result of the use of extremely thin laminae as the magnetic storage elements, a relatively low signal amplitude and a minimum of signal energy is required to effect magnetic saturation of these elements in the recording or writing process. Lower signal amplitude, in turn, promotes higher operating speeds where highly inductive transducer circuits are concerned.

In accordance with the foregoing considerations, it is an object of the invention to provide an improved magnetic information storage medium, and one which permits the derivation of output signals of an improved character from data magnetically stored thereby.

Another object is to provide digital data storage means which permits the conversion of signals magnetically stored thereby to high peak electrical output impulses.

Another object is to provide, as magnetic information storage means, a rotatable support having a surface layer comprising areas of magnetic and non-magnetic material in alternation in the direction of rotation thereof.

Another object is to provide a magnetic storage medium of layer form comprising alternate areas of different magnetic remanence.

Another object is to provide means for the magnetic recording and storing of digital information wherein boundaries between magnetized and unmagnetized areas thereof are inherently sharply defined.

Another object is to provide a sectionalized magnetic storage medium in the form of spaced laminae of magnetic material on the surface of a non-magnetic rotatable drum or disc to precisely define the boundaries of magnetizable signal areas of the medium and to permit of such a boundary being utilized as an indicator of the phase of rotation of said drum or disc.

Another object is to provide magnetic storage means of the above character wherein rewriting may be accomplished in well defined spatial relationship to previously stored information.

Another object is to provide sectionalization of a magnetic recording and storage layer on the surface of a rotatable support to permit increased reading and writing speeds for sequentially occurring digital data signals over speeds attainable with a non-sectionalized layer, when used in conjunction with transducers having an inductive reactance in part determined by the magnetic properties of said layer.

Another object is to provide a method of recording digital data existing as a sequence of electrical impulses wherein individual laminae of magnetic material are brought into the field of a recording head excited by said impulses in synchronism with the occurrences of the impulses for magnetization in accordance with the character thereof.

A further object is to provide a method of recording and reading digital data wherein the time constant of the winding circuit of an electromagnetic transducer is varied synchronously with the periodic recording or reading of data, to improve the speed of said operation.

Other objects and advantages of the invention will be apparent from consideration of the following specification and accompanying drawings in which.

Figure 9:
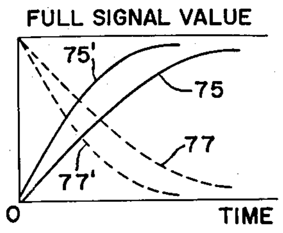

Fig. 9 presents graphs illustrative of the operation of the invention; and

Figure 10:
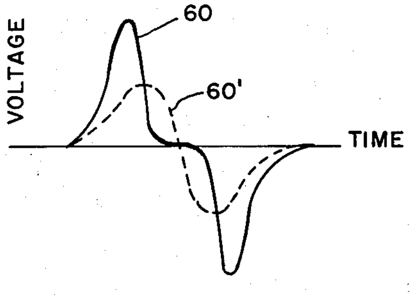

Fig. 10 is a diagram of wave forms, for purposes of explanation.

Figure 1:
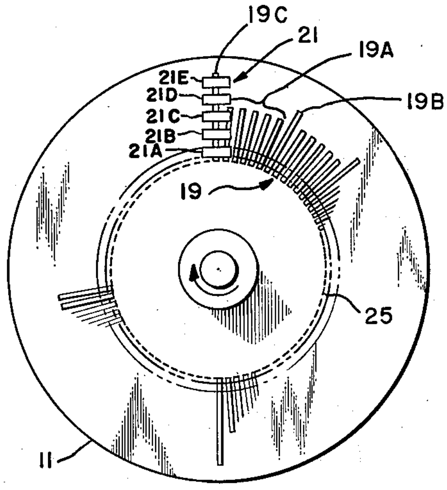
Fig. 1 is a front elevation of an assembly of a disc bearing a magnetic storage medium and cooperative electromagnetic transducers constructed and arranged in accordance with the principles of the invention.
Figure 2:
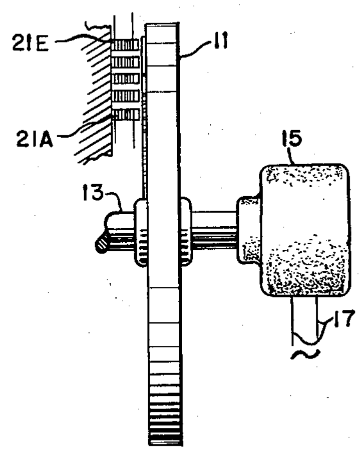
Fig. 2 is a side elevation of Fig. 1.

Referring now, more particularly to Figs. 1 and 2, there is shown a disc 11 of non-magnetic material, for example, aluminum, mounted on shaft 13, continuously driven by motor 15, for rotation therewith. Motor 15, excited from an A.C. supply by way of leads 17, may be a synchronous motor or may be of a type otherwise adapted to maintain a constant speed of rotation for disc 11. On the surface of the disc remote from motor 15 there is mounted magnetic material in a pattern of radially extending elongated laminae of bar form, collectively referenced as 19. Only a portion of the pattern is shown in Fig. 1. These laminae or bars, which usually will be of similar width and uniformly spaced, are suggestive of the spokes of a wheel and are at times herein referred to as "spokes." They may be formed of magnetic oxide material such as is commonly used for sound recording purposes or, more advantageously in the arrangements of the present invention, of material having a higher remanence such as one of the nickel-cobalt alloys, in order that they may be adapted to receive and retain a high level of signal magnetization. Alloys having a composition of the order of 25% Ni, 75% Co have proved satisfactory for this purpose. Disc 11, and corresponding members for supporting the data storage elements, while generally referred to herein as being constructed of non-magnetic material, may be constructed of material having certain magnetic properties provided the magnetic remanence is very much lower than that of the material of laminae 19.

The thickness of spokes 19 in the axial direction of disc 11 may be of the order of a few thousandths of an inch. By way of example, a thickness of 0.002 inch has proved satisfactory in practice. The spokes may either be raised above the surface of the disc proper or be flush therewith. In the former case, the non-magnetic material immediately spacing the spokes in the surface layer may simply be air or, alternatively, solid non-magnetic material (or material having negligible remanence) may be interposed therebetween. When the flush arrangement is used, the interposed non-magnetic material will be that of the disc itself. Since the thickness of the spokes is negligible in comparison with that of the disc the surface of the disc is considered herein to be substantially continuous and uninterrupted. The lateral boundaries of the spokes may be along actual radii of the disc although in practical arrangements for the storage of large amounts of data because of the limited lateral extent of the spokes parallel boundaries will not depart appreciably from a radial direction. In such arrangements a considerably higher spoke density is used than is indicated in Fig. 1.

It will be apparent that in each of the described mounting arrangements of the spokes there is a plurality of elongated, laterally spaced, magnetic laminae appearing in a surface layer of the disc and that in tracing a circular path about the axis of the disc comprising these laminae, definitely bounded areas of magnetic material alternate with areas of non-magnetic material.

Figure 3:
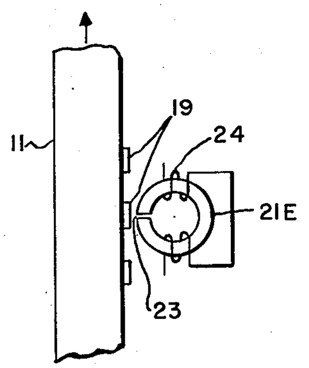
Fig. 3 is a fragmentary top plan view of Fig. 1, to an enlarged scale.

Magnetic heads for reading and writing purposes, collectively referenced as 21, cooperate with the spokes 19 and are positioned at various radial distances from the center of the disc so that as the disc rotates their respective projected positions on the surface of the disc trace a corresponding number of concentric circular data tracks. The heads each have a magnetic circuit which includes a narrow air gap in the portion thereof nearest disc 11, as gap 23 in head 21E (Fig. 3), and the portion of the head comprising this gap is closely and substantially constantly spaced from the disc during rotation of the latter member, the term "closely spaced" as used herein in this connection including arrangements in which actual contact occurs between head and disc or the laminae thereupon. Each head has a winding, as winding 24 of head 21E, which is adapted to receive electrical signal impulses for recording purposes. When a head is thus excited the resulting magnetic flux fringes from the gap in the magnetic circuit to magnetize laminae 19 as they are brought into a suitable position. In the reading process, the displacement of a magnetized lamina past the gap results in the generation of a voltage in the same winding proportional to the rate of change of flux linking the winding. Other arrangements may employ separate writing and reading heads.

A feature of the invention is provision for the storage and reading of recurrent signals having different periodicities relative to the rotation of the disc. For this purpose the spokes 19 may, as shown, extend various distances outwardly from an imaginary base circle indicated at 25, and be arranged according to a repeated pattern of spoke lengths. The magnetic head or heads with which a particular spoke cooperates is thus determined by the spoke length. As previously noted, only a portion of the complete pattern which covers the face of disc 11 is shown in Fig. 1. The spokes need not have their inner termini along a common base circle as here illustrated, it being important only that selected portions of the spokes be positioned to cooperate with appropriate heads.

The arrangement of spokes and heads shown in Fig. 1 is suited to the requirements of one type of digital computer memory. Here, a sub-sequence of the shortest spokes, collectively referenced as 19A, provides for the storage of discrete binary digits or "bits," and these spokes are illustrated as subject to the action of three stationary read-write heads, 21A, 21B and 21C, mounted at different radial distances from the axis of the disc. Only one group of read-write heads is shown in the figure. Other heads (not shown) may be used at other positions along the same tracks and the heads of a group may be staggered circumferentially as well as being radially displaced, for reasons of design. This sequence of short spokes 19A is preceded by a single longer spoke or digit marker bar 19B which is adapted in cooperation with head 21D to store and to furnish a signal signifying the end of a preceding group of digit signals. A still longer bar 19C, cooperative with head 21E, is termed a "bracket marker" bar and a signal stored thereby signifies the end of a bracket of digit signals, or word. Thus, in addition to the separation of "bits" of stored information provided by individual spokes 19A, the end of a digit and of a word are separately identified.

Figure 4:
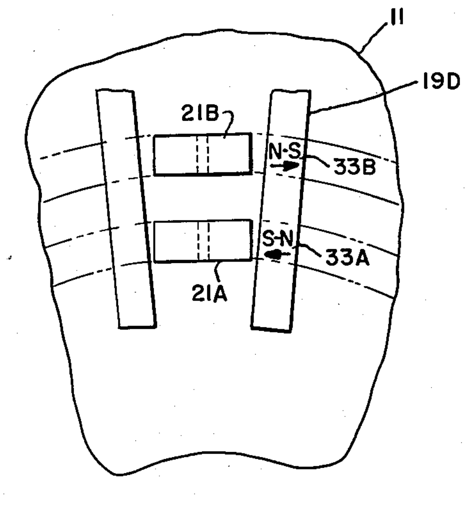
Fig. 4 is a fragment of Fig. 1, to an enlarged scale, indicating certain data tracks on the surface of the disc thereof.

As above described the arrangements of Fig. 1 provide three digit tracks, a digit marker track and a bracket marker track in each of which the magnetizable areas or cells are discrete, of definite extent and have the general form of a rectangle. According to one method of recording, the magnetization of such as area may be with the magnetic axis in the direction of rotation of disc 11, the sense of the magnetization, N–S or S–N, determining the binary value stored, either a "zero" or a "one," in the usual binary notation. This is illustrated, with exaggeration of spoke spacing, in Fig. 4 where, having passed beneath recording head 21A, area 33A of magnetic spoke 19D limited longitudinally of the spoke according to the track defined by head 21A, is indicated as having received magnetization in one direction, corresponding, for example, to a "zero," while area 33B in the track defined by head 21B is shown as having received an opposite magnetization, corresponding, say, to a "one." A feature of the invention previously referred to will here be apparent, namely, that by employing non-magnetic spacing material a type of recording can be employed which requires that there be no magnetization of the medium between signal areas.

The provision of definite boundaries for the storage areas in the direction of the radii of the disc, with the abrupt change in magnetic properties occurring at such boundaries, promotes the production of definitely located leading edges of short rise time in the voltage waves generated in the data reading process, and thereby permits using these portions of the waves in timing recording and other events in the computer. Also, as is particularly to be noted, it permits the derivation of such reference signals along a data track without the provision of a separate timing track, an important advantage where space is at a premium, and for economic reasons. This will be further referred to in connection with the arrangement of Figs. 5 and 6 which, in conjunction with Fig. 7, also illustrate the peculiar advantage of the disclosed sectionalized storage structure in connection with securing a desired registration of rewritten information, previously referred to herein, and in allowing wider limits for such registration.

Figure 5:
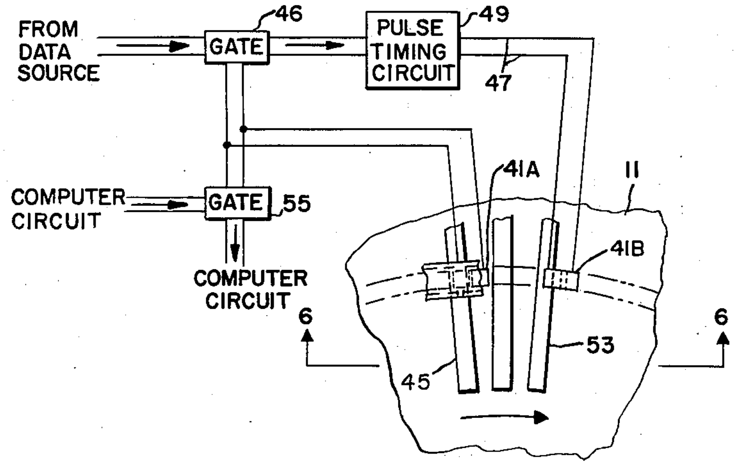
Fig. 5 is a schematic circuit diagram including a showing of a portion of the assembly of Fig. 1 and illustrating one mode of operation of the invention.
Figure 6:
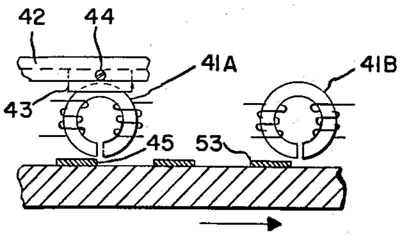
Fig. 6 is a fragmentary sectional view along the line 6—6 of Fig. 5.

In Fig. 5 two heads, 41A and 41B are shown as operating along the same data track. Preferably they are relatively adjustable as to their positions along said track, and adjustment for head 41A being indicated in Fig. 6 as stationary guide 42, in which mount 43 for head 41A is slidable, and setscrew 44. The heads may be more widely spaced than in the figures (up to 180 degrees apart), to minimize possible interference therebetween. Head 41A is shown as about to detect the leading edge of spoke 45 during rotation of disc 11 as seen by the relationship of the gap in the magnetic core of the head to said edge. The area of spoke 45 comprised in the indicated data track is assumed to be in a magnetized condition. The direction of magnetization is immaterial for edge detection purposes since an electrical impulse will be generated in head 41A as the edge of the spoke passes therebeneath regardless of such direction and this signal can be rectified and inverted as desired. The impulse thus generated is available for utilization in a variety of ways. It may be caused to open a gate, as gate 46 to control, directly or indirectly, the flow of data over leads 47 to head 41B for recording on an area of spoke 53. It may also control the flow of data to heads operating along other tracks, not indicated.

If it is provided that an impulse supplied over leads 47 has a period appreciably longer than that required for spoke 53 to pass beneath the gap in head 41B, as can be done without dependence on the duration of the original data impulse by introducing a pulse timing circuit 49 of conventional design, for example, a monostable multivibrator triggered or actuated by the data impulse, from which an output impulse of desired duration may be obtained, the control provided by relative adjustment of the positions of heads 41A and 41B makes it possible to initiate the energization of head 41B so that the period of its energization overlaps the period of the passage of spoke 53 beneath the head or coincides with any desired portion of the period of its passage. It will be apparent that operation in the former manner, for example, insures the complete erasure of information recorded on a data area of a spoke and the magnetization of the spoke over its complete track area by the new signal, thus reducing the harmful effect of unerased magnetization on the output electrical waveforms of a reading head.

Figure 7:
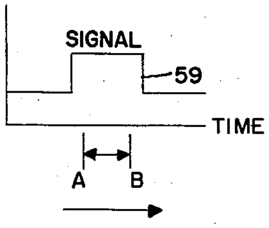
Fig. 7 is a diagram for purposes of explanation.

This advantageous method of operation is illustrated on a time basis by the diagram of Fig. 7 where the interval A–B represents the time required for spoke 53, for example, to pass beneath the gap in the magnetic circuit of head 41B, this gap being considered to be narrow in relation to the spoke width. Wave 59, representing the duration of a signal supplied over leads 47 to the head and hence the duration of the exterior magnetic field of the head during signal excitation, is shown as having a period and a position in time which causes it to overlap the interval A–B. This not only insures that the entire data track area of spoke 53 will be uniformly magnetized in response to a signal but in addition this overlap of the signal period permits appreciable variation in the time at which the start of the signal occurs without endangering this desirable condition of complete and uniform magnetization or the complete erasure of a previously written "bit" of information.

Fig. 5 also shows the output of head 41A as supplied to a second gate 55, symbolic of any control element in the computer circuits through the actuation of which the occurrence and sequence of events in the computer circuit may be timed.

In Fig. 10 solid line curve 60 is generally representative of the form of the voltage wave that can be expected when a magnetized element having sharply defined boundaries transverse of the data track, such as the discrete elements of the present invention, passes beneath a reading head. The leading edge of this wave has a relatively short rise time and reaches a relatively high peak value. The short rise time fits the wave, or at least the leading portion thereof, for use as a reference or timing impulse, as illustrated in the circuit of Fig. 5. The relatively high peak values obtained fit it for high level energization of means controlled thereby. By way of contrast the effect of a more or less gradual shading off of the boundary magnetization, such as may occur in continuous layer recording, is illustrated by dashed curve 60'. The spreading of the wave and the lower peak amplitudes of the leading and trailing portions thereof resulting from reduced values of the time derivative or rate of change of the flux linking the reading head winding, are to be noted.

As previously referred to, the definite boundaries of a magnetized area and the inherently unmagnetized condition of the material spacing such areas in the present arrangements permit a system of recording to be used where discrete different signals are produced for a "one" and a "zero," in contrast to conventional types of magnetic recording employing a continuous magnetizable medium where such recording often is impractical because of the spreading of the signal areas and lack of a clean-cut zero level.

The laminae constituting spokes 19 of Fig. 1 may be formed by plating the magnetic material on the surface of disc 11 or may be produced by etching out sections of a continuous magnetic layer, itself plated on or otherwise bonded to the disc. Plating or electroforming is a convenient method of obtaining a layer of composition material, such as the previously referred to high remanence nickel-cobalt alloys, and one which can very effectively be used in producing a sectionalized magnetic structure.

The operation of the above described storage device has largely been brought out in the description of the elements thereof. For use as a computer memory device disc 11 normally will operate at a high speed, to reduce access time. For example, a 10 inch disc may rotate at 3600 r.p.m. Heads 21 may have the dual functions of recording or writing and of reading information. When functioning as writing heads they are connected to appropriate sources of digital information. When reading stored information they are connected to appropriate utilization circuits of the computer. They and their connecting circuits, when not otherwise described, may be of conventional design. Data to be stored is supplied to a head as electrical impulses synchronously with the passage of the spokes beneath the head through the operation of described means resulting in the appropriate magnetization of the data cells of the track along which the head operates.

Figure 8:
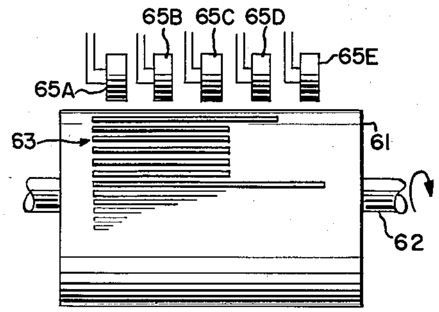
Fig. 8 shows a modification of the arrangements of Fig. 1 substituting a cylindrical drum for the disc of the former figure.

In Fig. 8, a structural modification of the device of Fig. 1 is shown which retains the functions of the earlier described device. Here the support for the magnetic storage medium is cylindrical drum 61, carried by shaft 62, adapted for rotatable mounting and driving by means (not shown) similar to those of Fig. 1. Drum 61 mounts parallel axially extending bars of magnetic material collectively referenced as 63, which may be and are shown as of different lengths, as are spokes 19 of Fig. 1 to which they correspond. Bar 63, again, preferably are thin laminae of a high remanence material and are mutually spaced either by air of by other non-magnetic material or by material which may be of a paramagnetic nature but which, as previously referred to, has a remanence very much lower than that of the data storage material. Heads 65A, 65B, 65C, 65D and 65E cooperate magnetically with bars 63 for writing and reading purposes and their projected positions on the surface of drum 61 trace circular data tracks along which magnetic and non-magnetic material alternate.

The operation of the device of Fig. 8 is similar to that of the arrangement of Fig. 1. The structural as well as the functional equivalence of these two modifications of the invention is to be noted. In each, an electromagnetic transducer cooperates with discrete magnetizable areas or cells in a circular track along which such areas are spaced by non-magnetic material or by material having greatly different magnetic properties, this track being traced by the projected position of the transducer on a surface of a relatively rotatable member, which surface is generated by the rotation about said axis of a line or linear element coplanar with the axis of rotation. Besides plane surfaces perpendicular to the axis of rotation (discs) and cylinders (drums) this family of surfaces includes cones which may also form the support for the magnetic laminae of the invention. In each case the magnetic material occupies successive positions of the generatrix of the surface and the heads defining the several data tracks are relatively displaced one from another in the direction of the generatrix. Finally, since circular tracks can be traced on any surface of revolution by a relatively stationary head, any such support can be employed for the sectionalized magnetic material of the invention.

The possible raising of the upper limit of the reading and writing speeds resulting from the periodic reduction of the time constant of the magnetic heads through sectionalization of the recording tracks is illustrated in Fig. 9. This figure shows as full-line curve 75 a typical build-up of current in a highly inductive circuit and as dashed curve 77 the decay of current in such a circuit. By periodically reducing the inductance (and the time constant) of a head before and after each data signal is recorded shorter build-up and decay times qualitatively illustrated as full-line and dashed curves 75' and 77', respectively, are attainable with the arrangements of the present invention.

While preferred embodiments of the invention have been shown and described herein, these are by way of illustration, only, and not by way of limitation. The appended claims, alone, define the limits of the invention.

I claim:

1. In digital computer apparatus the combination of a non-magnetic support, a pair of electromagnetic transducers, means for continuously producing uniform high speed relative motion between said support and said transducers about an axis, a plurality of thin narrow discrete laminae of high magnetic remanence material not more than five thousandths of an inch thick, mounted on said support along a surface of revolution thereof about said axis and respectively bounded along a circular path about said axis by adjacent non-magnetic high reluctance materials, one of said pair of transducers being adapted to develop an induced electrical signal in response to the change induced therein in the successive transition from non-magnetic to magnetic materials and conversely, the other transducer of said pair when excited over suitable periods being adapted to magnetize individual lamina, and circuit means connected to said other transducer and controlled in predetermined time relationship by said induced signal, said other transducer being excited by said circuit means to magnetize the lamina adjacent said other transducer with a signal having a selected duration with relation to the time of transit of said lamina past said other transducer.

2. In magnetic data storage apparatus the combination of a support of non-magnetizable material, first and second magnetic heads each having a winding thereon, means cooperating with said support and rotating said support about an axis continuously and at uniformly high speed relative to said heads of at least several thousand revolutions per minute, the support being in part bounded by a surface of revolution about said axis, said heads being juxtaposed to the surface of revolution portion of said support so that rotation of said support defines a track of each of said heads on said support, narrow thin discrete laminae of magnetizable material not more than five thousandths of an inch thick so disposed on said surface and normal to said tracks as to provide alternately narrow magnetizable and non-magnetizable areas, said laminae each having edges transverse of said tracks, said magnetic heads being differently spaced in the direction of a track from the corresponding transverse edges of the respectively next approaching magnetizable areas, said first head being adapted to generate a signal by magnetic induction in response to the passage of a magnetized material in proximity thereto, and circuit means exciting said second magnetic head under the control of said signal from said first head.

3. Magnetic data storage means as defined in claim 2 wherein means are provided for initial adjustment of the relative positions of said heads in the direction of a track.

References Cited in the file of this patent

UNITED STATES PATENTS

| | | |
|---|---|---|
| 2,080,100 | Tauschek | May 11, 1937 |
| 2,307,965 | Shepherd | Jan. 12, 1943 |
| 2,584,011 | Frost | Apr. 10, 1951 |
| 2,590,091 | Devol | Mar. 25, 1952 |
| 2,597,866 | Gridley | May 27, 1952 |
| 2,608,346 | Hopkins | Aug. 26, 1952 |
| 2,609,143 | Stibitz | Sept. 2, 1952 |
| 2,700,148 | McGuigan et al. | Jan. 18, 1955 |
| 2,730,699 | Gratian | Jan. 10, 1956 |